US012737851B2

(12) United States Patent
Gelman et al.

(10) Patent No.: US 12,737,851 B2
(45) Date of Patent: Sep. 15, 2026

(54) ENHANCED QUALITY BOREHOLE IMAGE GENERATION AND METHOD

(71) Applicant: Schlumberger Technology Corporation, Sugar Land, TX (US)

(72) Inventors: Andriy Gelman, Cambridge, MA (US); Arnaud Croux, Clamart (FR); Suraj Kiran Raman, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 231 days.

(21) Appl. No.: 18/714,417

(22) PCT Filed: Dec. 9, 2022

(86) PCT No.: PCT/US2022/081260

§ 371 (c)(1),
(2) Date: May 29, 2024

(87) PCT Pub. No.: WO2023/108119

PCT Pub. Date: Jun. 15, 2023

(65) Prior Publication Data

US 2025/0029213 A1 Jan. 23, 2025

Related U.S. Application Data

(60) Provisional application No. 63/287,871, filed on Dec. 9, 2021.

(51) Int. Cl.
*G06K 9/00* (2022.01)
*E21B 47/002* (2012.01)
(Continued)

(52) U.S. Cl.
CPC .............. *G06T 5/60* (2024.01); *E21B 47/002* (2020.05); *G01V 8/02* (2013.01); *E21B 2200/22* (2020.05);
(Continued)

(58) Field of Classification Search
None
See application file for complete search history.

(56) References Cited

U.S. PATENT DOCUMENTS

2015/0241591 A1 8/2015 Burmester
2022/0127950 A1* 4/2022 Pan .......................... G01V 5/12
(Continued)

FOREIGN PATENT DOCUMENTS

GB 2594547 A 11/2021
WO 2022066235 A1 3/2022

OTHER PUBLICATIONS

Singh, M. et al., "Machine Learning Assisted Petrophysical Logs Quality Control, Editing and Reconstruction", SPE-202977-MS, presented at the Abu Dhabi International Petroleum Exhibition Conference, Virtual Event, 2020, 15 pages.
(Continued)

*Primary Examiner* — Wei Wen Yang
(74) *Attorney, Agent, or Firm* — Jeffrey D. Frantz

(57) ABSTRACT

Methods for enhancing borehole images that learning patterns from historical borehole recorded mode image logs for a given basin to enhance real-time borehole images, use style characteristics from one example borehole recorded mode image to enhance real-time borehole images; optimize downhole data for transmission leveraging the presence of image enhancement frameworks on the surface, or combinations thereof.

15 Claims, 4 Drawing Sheets

(51) Int. Cl.
*G01V 8/02* (2006.01)
*G06T 5/60* (2024.01)

(52) U.S. Cl.
CPC ............... *G06T 2207/20084* (2013.01); *G06T 2207/30181* (2013.01)

(56) References Cited

U.S. PATENT DOCUMENTS

2023/0036713 A1* 2/2023 Pattnaik .................... G06T 5/60
2023/0332495 A1* 10/2023 Noufal ................ E21B 47/0025

OTHER PUBLICATIONS

Badrinarayanan, V. et al., "SegNet: A Deep Convolutional Encoder-Decoder Architecture For Image Segmentation" arXiv:1511.00561, Computer Vision and Pattern Recognition, 2015, 14 Pages.

Gatys, L.A. et al., "A Neural Algorithm Of Artistic Style" arXiv:1508.06576, Computer Vision and Pattern Recognition, 2015, 16 Pages.

* cited by examiner (a) Real Time Image (1.45 BPS) (b) Enhanced Image (c) Recoded Mode Image

ENHANCED QUALITY BOREHOLE IMAGE GENERATION AND METHOD

CROSS-REFERENCE TO RELATED APPLICATIONS

This application is a National Stage Entry of International Patent Application No. PCT/US2022/081260, filed on Dec. 9, 2022, which claims priority to U.S. Provisional Application No. 62/287,871, filed on Dec. 9, 2021, the entirety of which is incorporated by reference.

BACKGROUND

Field

The present disclosure generally relates to borehole image quality enhancement.

Description of the Related Art

Currently, different imaging tools that are part of a Bottom Hole Assembly (BHA), acquire imaging data of different modalities, compress them downhole and transmit the compressed data stream to the surface in real-time (RT Images). This compressed data stream is received on surface and decompressed in real-time to reconstruct the images. Operators in the field analyze these reconstructed borehole images to infer characteristics of the formations and fractures recorded in the images and make relevant decisions during runtime. In addition, an uncompressed version of this imaging data referred to as Recorded Mode Data (RM Images) is stored in memory downhole for reference after the completion of the job.

Borehole imaging data acquired downhole undergo significant compression due to limitations on telemetry bandwidth that prevent direct transmission of raw imaging data to the surface in real-time. The available bandwidth for real-time transmission typically varies across tools and jobs. Thus, the quality of images reconstructed on the surface is directly related to the telemetry bitrate chosen for that tool. In cases of tight bandwidth constraints, it could lead to a poor reconstruction of the image on the surface due to information loss and the presence of compression artifacts. Poorly reconstructed images directly affect the user experience leading to difficult and subjective interpretations/decision making.

The result of poorly reconstructed images can have significant impact on economic viability of a hydrocarbon recovery project. Images that do not accurately reflect geological conditions can lead engineers to make incorrect decisions. In the case of hydraulic fracturing, such incorrect decisions may cause operators to take actions that would otherwise not be undertaken. In hydraulic, borehole images may be used to determine the presence of hydrocarbons in the vicinity. Where incorrect information is present in the images, field personnel may determine that there is a presence of hydrocarbons, when, in fact, there are none. Field personnel may then schedule a hydraulic fracturing to occur in an area where production would be minimal. This results in a costly error and limits the overall production of the well.

Therefore, a need exists for a method that provides a fit-for-basin framework that can leverage computer power on the surface to enhance decompressed borehole images.

There is a further need to provide analysis capabilities that provide greater resolution for borehole images compared to conventional apparatus.

There is a still further need to provide a method to use existing data of geological formations in the area of a planned wellbore, capitalizing on known data and reducing errors.

There is a still further need to provide analysis techniques that are easy for field personnel to use, but that create superior results compared to conventional analysis techniques.

There is a further need to provide real time processing capability to allow field personnel to evaluate data immediately without the need for expensive laboratory post-processing of conventional apparatus.

BRIEF DESCRIPTION OF THE FIGURES

Certain embodiments, features, aspects, and advantages of the disclosure will hereafter be described with reference to the accompanying drawings, wherein like reference numerals denote like elements.

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

SUMMARY

Figure 1:
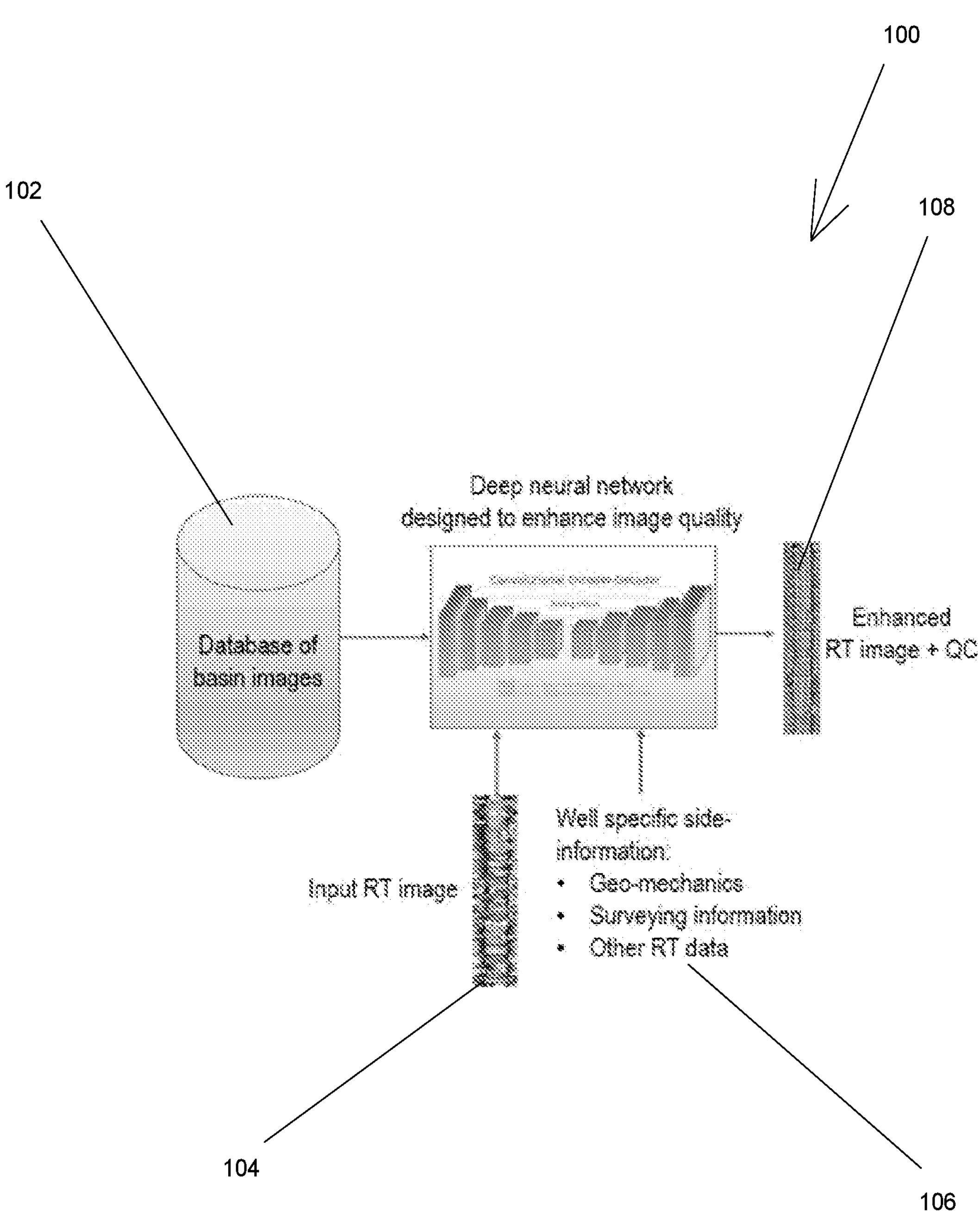
FIG. 1 shows a generic overview of the Image Enhancement Framework-Using Historical Borehole Image Data.

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

The method may include obtaining a data set of borehole data from a geological field and obtaining an image from a borehole that is created by field personnel. The method may also comprise obtaining well specific information from the borehole. The method may also comprise processing the data set of borehole data, the image from the borehole and the well specific information to produce an enhanced quality borehole image. The method may also comprise displaying the enhanced quality borehole image.

In another example embodiment, a method to modify a borehole image is disclosed. The method may provide for obtaining a data set of borehole data from a geological field and obtaining the borehole image created by field personnel. The method may also provide for obtaining well specific information from the borehole and processing the data set of borehole data from the geological field, the borehole image created by field personnel, and the well specific information to produce an enhanced quality borehole image, wherein the processing is performed by a deep neural network that uses a convolutional encoder and decoder. The method may also provide for displaying the enhanced quality borehole image.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are notintended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface. These terms, as used herein, should not be considered limiting of the disclosure presented here. As will further be understood, in drilling terms, drilling may occur at angles or even horizontally in creation of the wellbore/borehole. As used herein, the terms wellbore and borehole may be used interchangeably. This may include, for example, an open hole wellbore. Other embodiments may include a cased wellbore.

Aspects of the disclosure provide for borehole images that are superior to those produced by conventional analysis. Conventional analysis provides a "once through" technique. Downhole tools obtain data from the downhole environment and are represented up-hole after transmission. Little to no post-processing is performed in the field. In instances where the data is not accurate, the field engineers must make decisions with substandard information or must stop the job and obtain further information to make correct decisions. Aspects of the disclosure presented herein; however, allow field engineers and/or field staff to have the best available information to allow the project to continue and correct decisions to be make. In a significant improvement over conventional analysis, data from other wells may be used in order to provide increased accuracy borehole logs. As a non-limiting example, data from nearby wellbores may indicate a geological fracture at elevation −502. This may be a standard defect through multiple wellbores. In data obtained from the downhole environment; however, such defect may not be present in the current wellbore due to errors developed in compression techniques sending data from the downhole environment to the up-hole environment. In conventional analysis techniques, such errors are "invisible" and would not be identified. Aspects of the disclosure, can correct for these defects and are considered a significant improvement over conventional technologies.

The embodiments of the disclosed methods can leverage the presence of historical data from previous jobs grouped by basins to allow for greater borehole quality image enhancement. The historical data from previous related projects can include Real-Time Images compressed at different bit rates and corresponding Recorded Mode Images from jobs performed in the past, as a non-limiting example. Recorded Mode Images represent the ideal ground truth for reconstructions on the surface. The disclosed framework employs specific neural network architectures to bridge the gap between the decompressed Real Time images and the Recorded Mode Images by learning to map the two image pairs. As will be understood, the specific neural network architectures may be augmented, to provide superior computing capabilities.

Aspects of the disclosure provide for methods that allow for increased borehole quality image enhancement to allow engineers to properly evaluate engineering features of geological formations through which the wellbore travels. Greater accuracy of the evaluation procedure allows for more accurate engineering quantifications for ultimately better production and wellbore service for the wellbore. Aspects of the disclosure also allow for "real time" evaluation of these features, allowing for field personnel to continue working without lay up periods required for conventional methods of evaluation. These evaluative methods, moreover, can be performed on non-specialized computing equipment without extensive training of personnel, thereby not only leading to faster solutions, but also more cost-effective solutions. The enhanced quality borehole images may be displayed next to the original data from which the enhancements are determined. This will allow field personnel to easily quantify the amount of data that has been modified with the methods provided. If, for example, the amount of data has been drastically changed, field personnel may determine that the changes are too great and that further data may need to be obtained to provide surety with the data.

Neural networks with deep convolutional layers are very good at identifying interesting patterns in images. In the context of borehole image data, these patterns correspond to unique formations and fractures. Deep convolutional networks can be used to encode the most significant features and hence denoise the input images during the decoding phase. A generic overview of this framework is shown in FIG. 1. Training to map real time images to recorded mode images enables the neural network to learn to transform interesting features across the two domains, thus helping in handling compression artefacts and hence enhancing the image quality.

Referring to FIG. 1, an arrangement 100 is illustrated. The arrangement 100 may be a computer or other computing device. Inputs may be supplied to the arrangement 100 include, at 102, data obtained from downhole tools from past projects. Another input may include, at 104, real time images from downhole tools from the current project. Another input may include, at 106, data related to well specific side information. Such data may include geo mechanics data, surveying information and other wellbore RT information. The data at 102, 104, 106 may be input to the arrangement 100 to develop enhanced quality borehole images at 108.

Figure 2:
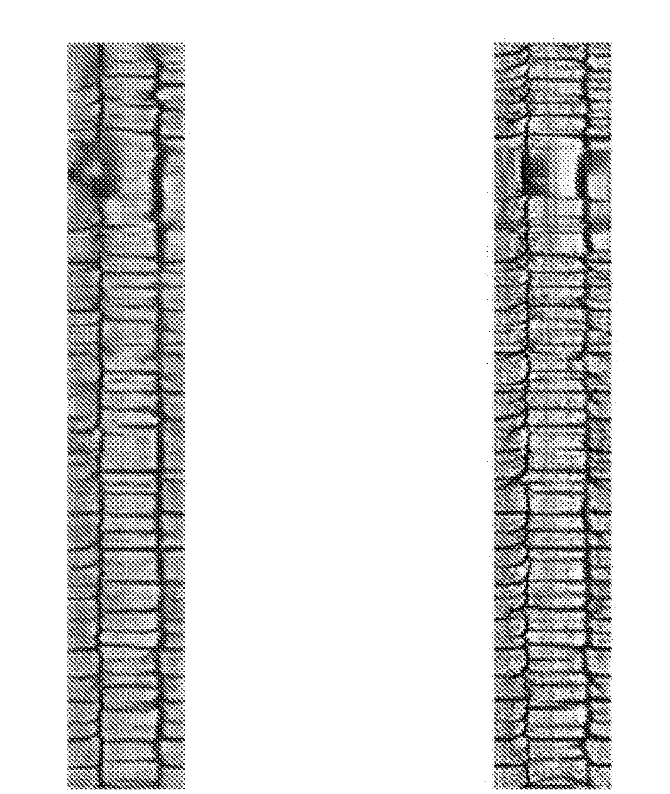
FIG. 2 depicts an example Borehole Image Enhancement with Encoder-Decoder Networks, according to an embodiment of the disclosure.

Learning from lots of examples from the past enables the understanding of typical formations and fractures. Since the formations and fractures are unique across different basins/geo-locations, this framework would best suit fit-for-basin use-cases. Evaluating on unseen real-time images, as shown in FIG. 2 depict the success of the proposed framework with a significantly enhanced image (FIG. 2*b*) with fewer compression artefacts enabling improved and decisive inference.

In one or more embodiments, the framework can be enhanced by adding well specific side-information enabling better enhancement by compensating for the information loss due to compression and/or transmission. These could be other real-time measurements, geo-mechanics or surveying information. This could potentially help with defining and understanding geo-location specific characteristics better. One substantial advantage of this framework is that it only leverages the presence of compute power on the surface and requires no change to its downhole components, achieving improved borehole image quality without any compromise to the telemetry bit rate.

The disclosed methods can leverage prior knowledge about the well and an example borehole Recorded Mode Image to transfer its style to the Real Time Image and in-turn enhance it. Pre-Trained Convolutional Neural networks can be used to extract relevant features from an image and transfer its style (texture) onto a completely different image. Neural Style Transfer employs similar neural network architectures to transfer styles across images for artistic purposes. In the context of borehole image data, style/textures correspond to interesting formations and features. Given a reference Recorded Mode Image (Style Image), style transfer for borehole images effectively adds additional information to the decompressed image, thus enhancing the real-time image.

Figure 3:
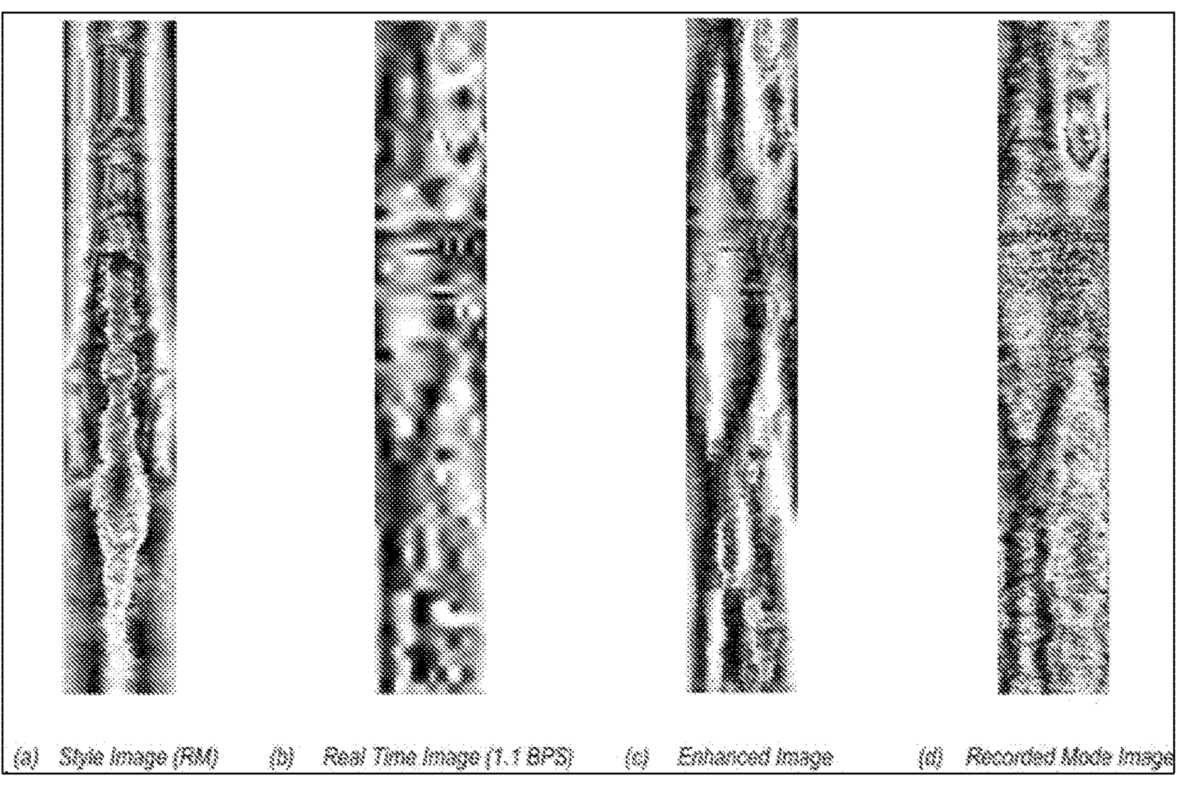
FIG. 3 depicts an example Borehole Image Enhancement Using StyleCharacteristics from example RM image (a), according to an embodiment of the disclosure.

Evaluating on unseen Real Time Images as shown in FIG. 3, with a relevant Style Image (FIG. 3A), we can clearly see the improvement in the image quality (FIG. 3*c*) of the real-time image showing sharp features very comparable to its ideal ground truth (FIG. 3*d*). Neural Networks show the capability of transforming the sharp textures from Style Image to the decompressed image, thus enhancing its formation features. As will be understood, different types and qualities of data may be present in the historical records of previously completed work compared to the newly completed wellbore. To this end, if lower quality field equipment is used in the current wellbore, historical data may be used to augment the data of the lower quality field equipment to provide greater resolution.

Enhancement performance can depend on the chosen Style Image and hence it is necessary that textures of the chosen Style Image is similar to the well in use. Hence, this method can be tailored specifically to target groups of wells that share similar formation characteristics with each group being assigned with a relevant Style Image. A more robust framework would automatically select a good style image during run-time from a pool of styles. We can use prior knowledge about the well like geo-location, formation characteristics etc., to identify a relevant style image. In one or more embodiments, the method can compare the pool of styles with the recorded mode data (saved in memory downhole in real-time) downhole to identify a suitable style and transmit this style index as side-information to the surface for Image Enhancement. In addition, this framework can be generalized even further by including additional side information that could also have some physical interpretation. This framework again achieves enhanced borehole image quality without compromising on the constrained telemetry bitrate.

One or more embodiments of the method can include completing the loop to optimize the data transmitted (adapt downhole compression) from downhole, thus using the constrained telemetry bitrate more effectively. For example, greater weights can be applied during compression to those features that ensure optimal reconstruction at the surface.

The disclosed methods can provide enhanced borehole image quality without any compromise to the telemetry bitrate. The disclosed methods can also improve user experience for the operators in the field, display enhanced images in parallel to the actual real-time image to remove model bias and enables operators to use their experience in interpreting to make educated judgements aided by the enhanced image, provide enhanced image quality that can enable improved decision making and significantly reduce false judgements due to subjective calls.

Figure 4:
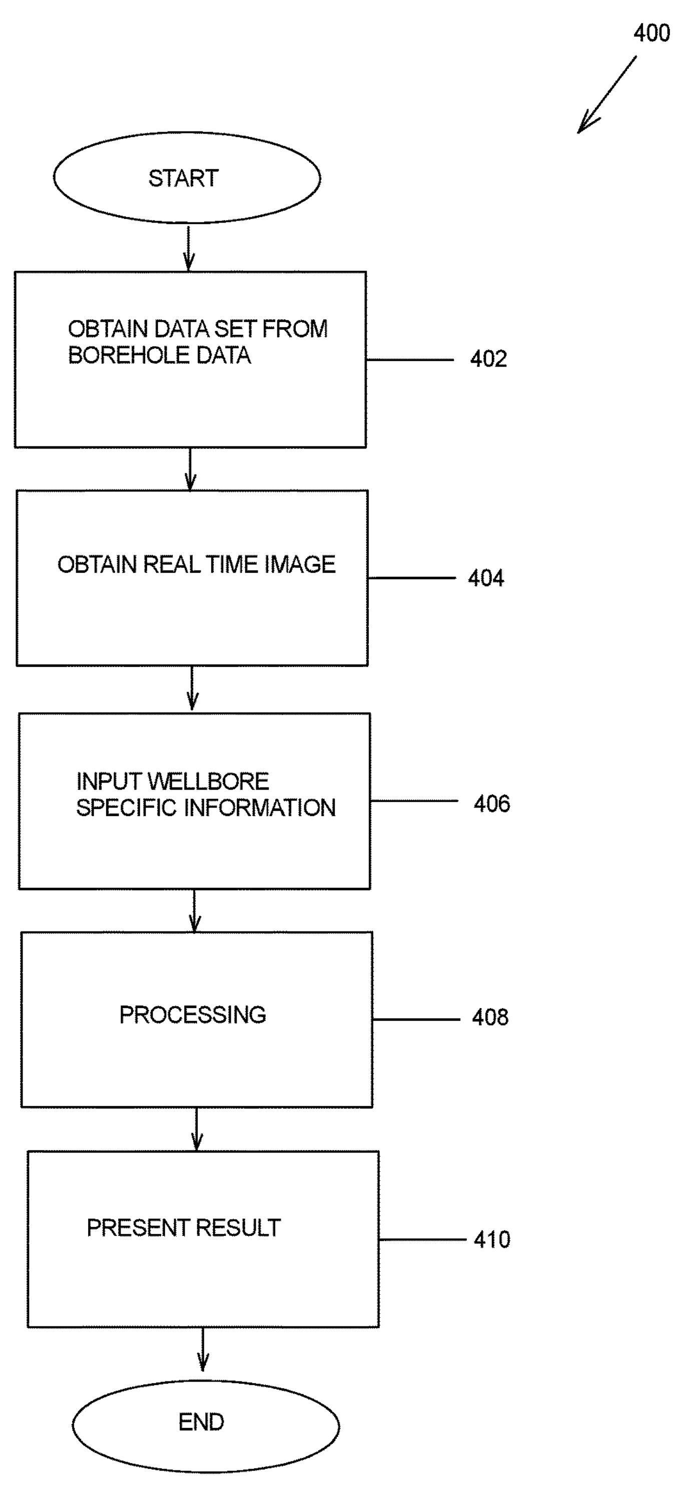
FIG. 4 is a method of producing a borehole image with quality enhancement.

Referring to FIG. 4, a method 400 of producing an enhanced borehole quality image is illustrated. The method 400 may include, at 402, obtaining a data set of borehole data from a geological field. In instances, the borehole data may be related to a specific geological field in an area wherein a borehole to be generated is located. In other embodiments, the data set of borehole data may be according to a field that may have similarities to the borehole to be generated. Similarities between the data set of borehole data and the borehole to be generated may be depth, size, type of stratum or other feature.

The method 400 continues at 404, wherein a real time image is obtained from a borehole that is created by field engineers. The real time image may be any resolution and use various geological formation values to generate the real time image. Different tools may be used to produce the real time image produced for further processing in 404. In embodiments, the different tools may be a nuclear tool, an acoustic tool, a wireline tool (after creation of the borehole), and a logging while drilling tool. In embodiments, the real time image may be at any scale. Optical analysis may be carried out to create the real time image. Such visual imaging may be the only method used for the borehole image generation, or visual imaging may be used in conjunction with other analysis methods. Generally, visual imaging is used, for example, in fracture identification in an open hole environment. In instances which use ultrasonic technologies, borehole images generally use ultrasonic signals sent by a transmitter or transducer and received to determine soil properties around the borehole. The attenuation or non-attenuation of the ultrasonic signals allows engineers to determine a multitude of features that may be used by the method 400 to determine an enhanced borehole image.

The data obtained from step 402 and from step 404 are fed into a deep neural network, at 406 for evaluation. For purposes of illustration, the deep neural network may be coded to allow for evaluation of data. The deep neural network may be, for example, placed upon a computer, a laptop computer, a main frame computer or other computing arrangement. The listed types of computers should not be considered limiting. For purposes of example, the neural network may be "deep", which would include different levels of evaluation nodes for the network. Such evaluation nodes may allow for additional processing of data.

Further information may also be fed into the computing system for evaluation. This further data is designated in 406.

At 406, well specific information may be input. The well specific information may be, for example, data related to geo mechanics, surveying information and other wellbore information, such as real time data. This data may be provided directly through on-site equipment, such as down hole tools. In other instances, data may be obtained from recorders installed with the down hole tools. In still other instances, the data may be contained at surface level recorders, such as computers, that receive data from downhole tools.

The inputs are fed into a network at 408 and processed. In embodiments, the deep neural network may be created to be a "learning" network. Such learning networks may use an iterative process to incrementally allow for correct answers to be identified and incorrect answers to be discarded in favor of more correct answers. To achieve these results, different weights may be assigned to nodes in the deep neural network to allow for a decision-making process to be altered either by programmers or through iterative means, to produce more correct results. For example, in some nodes, it may be determined that result A is correct 90 percent of the time compared to result B. Thus, during decision within a node, if the decision-making process placed an equivalent amount of possibility on each result A and B, more errors would occur compared to placing a weighting of 90 percent of result A.

In embodiments, the deep neural network may include different levels of processing. In embodiments, the network may provide for several levels of decision-making nodes. By providing for several levels of nodes, the deep neural network may identify correct answers more reliably. The neural network, in a most basic form, includes an input layer, a "hidden" layer and an output layer. By adding more nodes, additional "hidden" layers may be added to increase the processing.

The data is processed at 408 and a result is presented at 410. The result at 410, presents an enhanced borehole image using the input data at 402, 404 and 406. The result may be a stream of data written to a data file in a non-volatile memory, in one example embodiment. In another example embodiment, the data may be visually displayed. In another example embodiment, the data may be printed. The above-identified display techniques should not be considered limiting. For comparison, the data obtained from the real time image taken by downhole tools may be displayed next to the enhanced version calculated at 408. In non-limiting embodiments, comparative lengths of a borehole are illustrated. The axial lengths; therefore, correspond along the length of the borehole data. In embodiments, the method 400 may be performed during the drilling process. In other embodiments, the method 400 may be performed during wellbore investigative procedures, such as with wireline operations. In still further embodiments, the method 400 may be performed during a combination of drilling and wireline operations.

Aspects of the disclosure provided above present a method that provides a fit-for-basin framework that can leverage compute power on the surface to enhance decompressed borehole images.

Aspects of the disclosure provide analysis capabilities that provide greater resolution for borehole images compared to conventional apparatus.

Further aspects of the disclosure provide a method that uses existing data of geological formations in the area of a planned wellbore, capitalizing on known data and reducing errors.

Embodiments provide analysis techniques that are easy for field personnel to use, but that create superior results compared to conventional analysis techniques.

Real time processing capability is provided in embodiments, to allow field personnel to evaluate data immediately without the need for expensive laboratory post-processing of conventional apparatus.

Example embodiments will now be disclosed. The example embodiments disclosed should not be considered limiting of the disclosure, but rather examples of possible methods and apparatus. In one example embodiment, a method is disclosed. The method may include obtaining a data set of borehole data from a geological field and obtaining an image from a borehole that is created by field personnel. The method may also comprise obtaining well specific information from the borehole. The method may also comprise processing the data set of borehole data, the image from the borehole and the well specific information to produce an enhanced quality borehole image. The method may also comprise displaying the enhanced quality borehole image.

In another example embodiment, the method may be performed wherein the data set of borehole data from the geological field is from previously performed projects.

In another example embodiment, the method may be performed wherein the image is a real time image obtained from the borehole.

In another example embodiment, the method may be performed wherein the well specific information includes at least one of data related to geomechanics, surveying information for the borehole and real time data.

In another example embodiment, the method may further comprise storing the enhanced quality borehole image in a non-volatile memory.

In another example embodiment, the method may be performed wherein the method is performed during one of wellbore creation and wellbore investigation.

In another example embodiment, a method to modify a borehole image is disclosed. The method may provide for obtaining a data set of borehole data from a geological field and obtaining the borehole image created by field personnel. The method may also provide for obtaining well specific information from the borehole and processing the data set of borehole data from the geological field, the borehole image created by field personnel, and the well specific information to produce an enhanced quality borehole image, wherein the processing is performed by a deep neural network that uses a convolutional encoder and decoder. The method may also provide for displaying the enhanced quality borehole image.

In another example embodiment, the method may be performed wherein the data set of borehole data from the geological field is from previously performed projects.

In another example embodiment, the method may be performed wherein the borehole image is a real time image.

In another example embodiment, the method may be performed wherein the well specific information includes at least one of data related to geomechanics, surveying information for the borehole and real time data.

In another example embodiment, the method may further comprise storing the enhanced quality borehole image in a non-volatile memory.

In another example embodiment, the method may be performed, with artificial intelligence.

In another example embodiment, the method may be performed wherein the artificial intelligence includes at least one hidden node layer.

In another example embodiment, the method may be performed wherein the at least one hidden node layer has weighting for each of the nodes in the layer.

In another example embodiment, the method may be performed in an iterative process.

In another example embodiment, the method may be performed wherein the method is performed during one of wellbore creation and wellbore investigation.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10 percent of, within less than 5 percent of, within less than 1 percent of, within less than 0.1 percent of, and/or within less than 0.01 percent of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those with ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method, comprising:

obtaining a data set of borehole data from a geological field, the data set of borehole data comprising historical borehole recorded-mode image data from previously-completed borehole operations, the historical borehole recorded-mode image data being grouped by geological basin, the historical borehole recorded-mode image data comprising real-time images compressed at different bit rates and corresponding recorded-mode images from the previously-completed borehole operations;

obtaining a real-time borehole image created by field personnel, the real-time borehole image being included in a compressed data stream transmitted to a surface and decompressed in real-time to reconstruct the real-time borehole image;

obtaining well-specific information from the borehole, the well-specific information comprising at least one of: geomechanics data, surveying information, real-time borehole data, or other wellbore information;

processing the data set of borehole data, the real-time borehole image, and the well-specific information to generate an enhanced-quality borehole image, the processing comprising feeding the data set, the real-time borehole image, and the well-specific information into a deep neural network comprising deep convolutional layers configured to encode significant features and denoise the real-time borehole image during a decoding phase, the deep neural network learning to bridge a gap between decompressed real-time images and recorded-mode images by learning to map two image pairs to transform features across two domains and handle compression artefacts; and displaying the enhanced-quality borehole image.

2. The method according to claim 1, wherein the data set of borehole data from the geological field is from previously-performed projects.

3. The method according to claim 1, further comprising storing the enhanced-quality borehole image in a non-volatile memory.

4. The method according to claim 1, wherein the method is performed during at least one of wellbore creation or wellbore investigation.

5. A method to modify a borehole image, the method comprising:

obtaining a data set of borehole data from a geological field, the data set comprising historical data from previously-completed borehole operations, the historical data being grouped by basin, the historical data comprising real-time images compressed at different bit rates and corresponding recorded-mode images from the previously-completed borehole operations;

obtaining a real-time borehole image created by field personnel, the real-time borehole image being included in a compressed data stream transmitted to a surface and decompressed in real-time to reconstruct the real-time borehole image;

obtaining well-specific information from the borehole, the well-specific information comprising at least one of: geomechanics data, surveying information, real-time borehole data, or other wellbore information;

processing the data set of borehole data from the geological field, the real-time borehole image created by field personnel, and the well-specific information to generate an enhanced-quality borehole image, the processing being performed by a deep neural network comprising a convolutional encoder, a convolutional decoder, and a deep neural network, the deep neural network comprising deep convolutional layers configured to encode significant features and denoise the real-time borehole image during a decoding phase, the deep neural network learning to bridge a gap between decompressed real-time images and recorded-mode images by learning to map two image pairs to transform features across two domains and handle compression artefacts; and displaying the enhanced-quality borehole image.

6. The method according to claim 5, wherein the data set of borehole data from the geological field is from previously-performed projects.

7. The method according to claim 5, further comprising storing the enhanced-quality borehole image in a non-volatile memory.

8. The method according to claim 5, wherein the method is performed during at least one of wellbore creation or wellbore investigation.

9. The method according to claim 5, wherein the deep neural network further comprises at least one hidden node layer.

10. The method according to claim 9, wherein the at least one hidden node layer has weighting for each of the nodes in the layer.

11. The method according to claim 10, wherein the method is performed as an iterative process.

12. The method according to claim 1, wherein the deep neural network is trained using historical borehole recorded-mode image data grouped by geological basin such that the deep neural network is applied to the real-time borehole image from a geological basin having similar formation characteristics to the historical borehole recorded-mode image data used during the training.

13. The method according to claim 1, wherein the displaying the enhanced-quality borehole image comprises displaying the enhanced-quality borehole image in parallel with the borehole image created by field personnel to enable comparison of a portion of the borehole along an axial length of the borehole.

14. The method according to claim 1, wherein the deep neural network uses a recorded-mode image among the historical borehole recorded-mode image data as a reference style image to transfer texture information from the recorded-mode image to the real-time borehole image.

15. The method according to claim 1, wherein the recorded-mode images represent ground truth for image reconstruction on the surface.

* * * * *